(12) United States Patent
Thubert et al.

(10) Patent No.: US 9,882,804 B2
(45) Date of Patent: Jan. 30, 2018

(54) CO-EXISTENCE OF A DISTRIBUTED ROUTING PROTOCOL AND CENTRALIZED PATH COMPUTATION FOR DETERMINISTIC WIRELESS NETWORKS

(71) Applicant: Cisco Technology, Inc., San Jose, CA (US)

(72) Inventors: Pascal Thubert, La Colle Sur Loup (FR); Eric Levy-Abegnoli, Valbonne (FR); Patrick Wetterwald, Mouans Sartoux (FR); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 738 days.

(21) Appl. No.: 14/038,253

(22) Filed: Sep. 26, 2013

(65) Prior Publication Data
US 2015/0089081 A1 Mar. 26, 2015

(51) Int. Cl.
| | |
|---|---|
| *G06F 15/173* | (2006.01) |
| *H04L 12/721* | (2013.01) |
| *H04W 40/26* | (2009.01) |
| *H04W 40/30* | (2009.01) |
| *H04L 12/717* | (2013.01) |
| *H04L 12/753* | (2013.01) |

(52) U.S. Cl.
CPC ........... *H04L 45/12* (2013.01); *H04L 45/42* (2013.01); *H04L 45/44* (2013.01); *H04W 40/26* (2013.01); *H04W 40/30* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 7,366,111 | B2 | 4/2008 | Thubert et al. |
| 7,668,119 | B2 | 2/2010 | Thubert et al. |
| (Continued) | | | |

FOREIGN PATENT DOCUMENTS

| | | |
|---|---|---|
| EP | 2 418 802 A1 | 2/2012 |
| WO | WO 2010/056354 A1 | 5/2010 |
| WO | WO 2011/035804 A1 | 3/2011 |

OTHER PUBLICATIONS

Farrel, et al., "A Path Computation Element (PCE)-Based Architecture", The Internet Society, Network Working Group, Request for Comments 4655, dated Aug. 2006, 41 pages.

(Continued)

*Primary Examiner* — Lance Leonard Barry
*Assistant Examiner* — Mohammad Yousuf A Mian
(74) *Attorney, Agent, or Firm* — Parker Ibrahim & Berg LLC; James M. Behmke; Stephen D. LeBarron

(57) ABSTRACT

In one embodiment, a device both communicates with a network operating a distributed proactive routing protocol, and participates in a centralized path computation protocol. The device communicates routing characteristics of the distributed proactive routing protocol for the network from the network to the centralized path computation protocol, and also communicates one or more computed paths from the centralized path computation protocol to the network, where the computed paths from the centralized path computation protocol are based on the routing characteristics of the distributed proactive routing protocol for the network.

21 Claims, 10 Drawing Sheets

(56) References Cited

U.S. PATENT DOCUMENTS

| | | | |
|---|---|---|---|
| 8,259,635 B2 | 9/2012 | Thubert et al. | |
| 2008/0219272 A1* | 9/2008 | Novello | H04L 47/11 370/401 |
| 2009/0208206 A1* | 8/2009 | Madrahalli | H04L 45/02 398/45 |
| 2009/0285101 A1* | 11/2009 | Lu | H04L 41/12 370/238 |
| 2011/0176459 A1* | 7/2011 | Patel | H04W 72/1257 370/256 |
| 2011/0231573 A1 | 9/2011 | Vasseur et al. | |
| 2012/0026886 A1* | 2/2012 | Wang | H04L 45/42 370/238 |
| 2012/0127875 A1* | 5/2012 | Zhao | H04L 12/4625 370/252 |
| 2013/0159550 A1* | 6/2013 | Vasseur | H04W 40/248 709/242 |
| 2013/0223218 A1* | 8/2013 | Vasseur | H04L 45/34 370/232 |
| 2015/0078204 A1* | 3/2015 | Thubert | H04L 5/0067 370/255 |
| 2015/0085668 A1* | 3/2015 | Guo | H04L 43/0894 370/238 |

OTHER PUBLICATIONS

Gnawali, et al., "The Minimum Rank with Hysteresis Objective Function", Request for Comments 6719, dated Sep. 2012, 13 pages, Internet Engineering Task Force Trust.

Thubert, P., "Objective Function Zero for the Routing Protocol for Low-Power and Lossy Networks (RPL)", Request for Comments 6552, dated Mar. 2012, 14 pages, Internet Engineering Task Force Trust.

Vasseur, et al., "Path Computation Element (PCE) Communication Protocol (PCEP)", IETF Trust, Network Working Group, Request for Comments 5440, dated Mar. 2009, 87 pages.

Vasseur, et al., "Routing Metrics Used for Path Calculation in Low-Power and Lossy Networks", Request for Comments 6551, dated Mar. 2012, 30 pages, Internet Engineering Task Force Trust.

Winter, et al., "RPL: IPv6 Routing Protocol for Low-Power and Lossy Networks", Request for Comments 6550, dated Mar. 2012, 157 pages, Internet Engineering Task Force Trust.

International Search Report dated Apr. 29, 2015 issued in connection with PCT/US2014/057381.

\* cited by examiner

US 9,882,804 B2

CO-EXISTENCE OF A DISTRIBUTED ROUTING PROTOCOL AND CENTRALIZED PATH COMPUTATION FOR DETERMINISTIC WIRELESS NETWORKS

TECHNICAL FIELD

The present disclosure relates generally to computer networks, and, more particularly, to distributed routing protocols and centralized path computation, especially their co-existence for deterministic wireless networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc.

As more and more uses for LLNs are being deployed, such as in the industrial space, determinism of the network communications and their standardization is becoming a primary point of focus within the networking community. In particular, deterministic networking refers to networks that can guarantee the delivery of packets within a bounded time. Generally, this relates to achieving characteristics such as guaranteed delivery, fixed latency, and jitter close to zero (e.g., micro seconds to tens of milliseconds depending on application). Achieving these characteristics within the architecture of an LLN, however, is not trivial, due to the constrained nature of LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
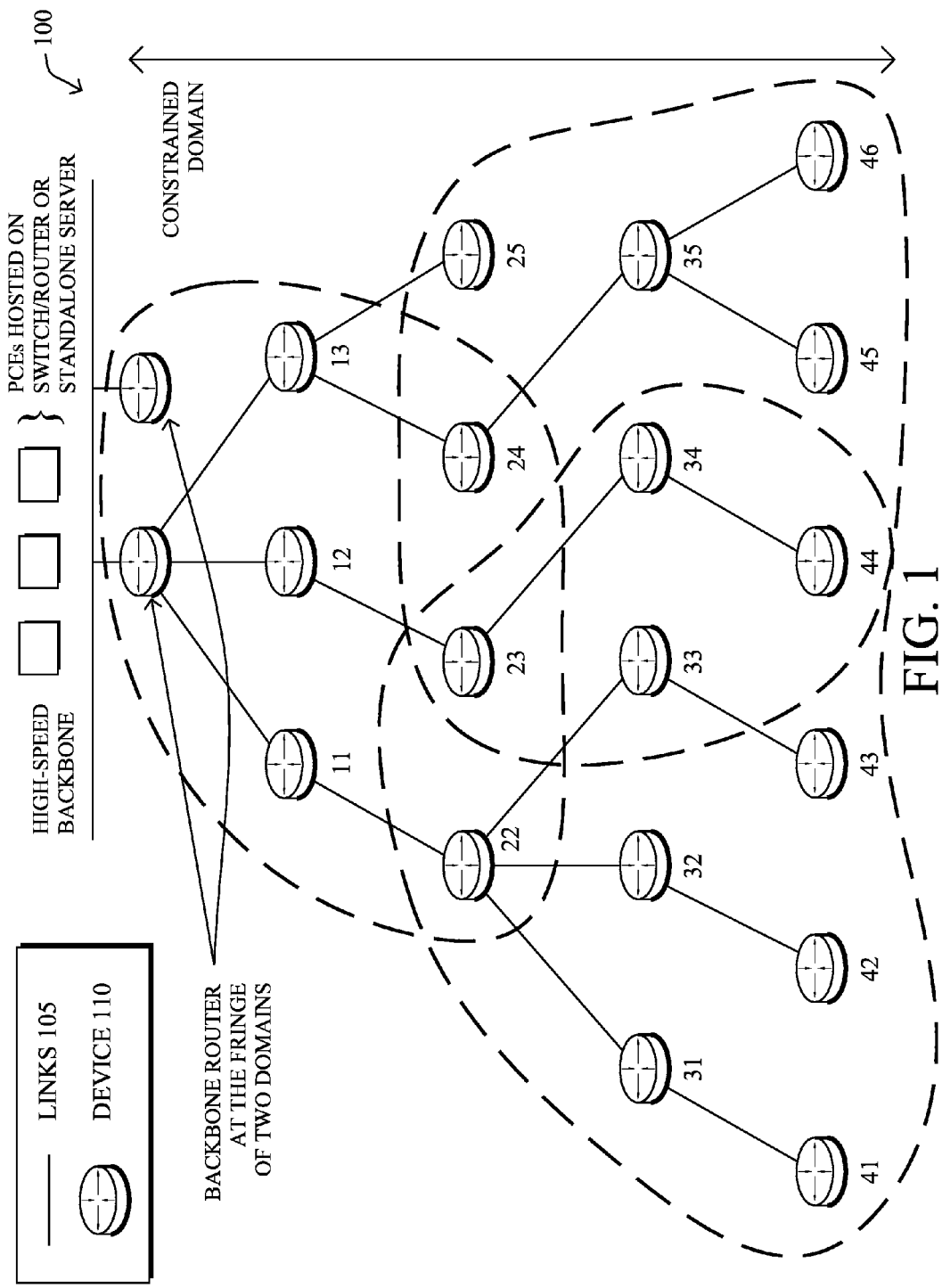
FIG. 1 illustrates an example communication network.

According to one or more embodiments of the disclosure, a device both communicates with a network operating a distributed proactive routing protocol, and participates in a centralized path computation protocol (where the device may be a centralized path computation element (PCE) or a device within the network (e.g., a field area router (FAR) or other device)). The device communicates routing characteristics of the distributed proactive routing protocol for the network from the network to the centralized path computation protocol, and also communicates one or more computed paths from the centralized path computation protocol to the network, where the computed paths from the centralized path computation protocol are based on the routing characteristics of the distributed proactive routing protocol for the network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "backbone," "11," "12," . . . "46," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. Also, as shown, the backbone devices may connect the nodes of the network to a backbone network, such as via a dedicated wireless link or wired connection, where the backbone network may be proprietary and/or public (e.g., the Internet), and may contain various resources such as servers, switches, routers, etc. Those skilled in the art will understand that any number of nodes, devices, links, etc. may be used in the computer network, and that the view shown herein is for simplicity. Also, those skilled in the art will further understand that while s the network is shown in a certain orientation, particularly with a "root" backbone node, the network 100 is merely an example illustration that is not meant to limit the disclosure.

Data packets (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
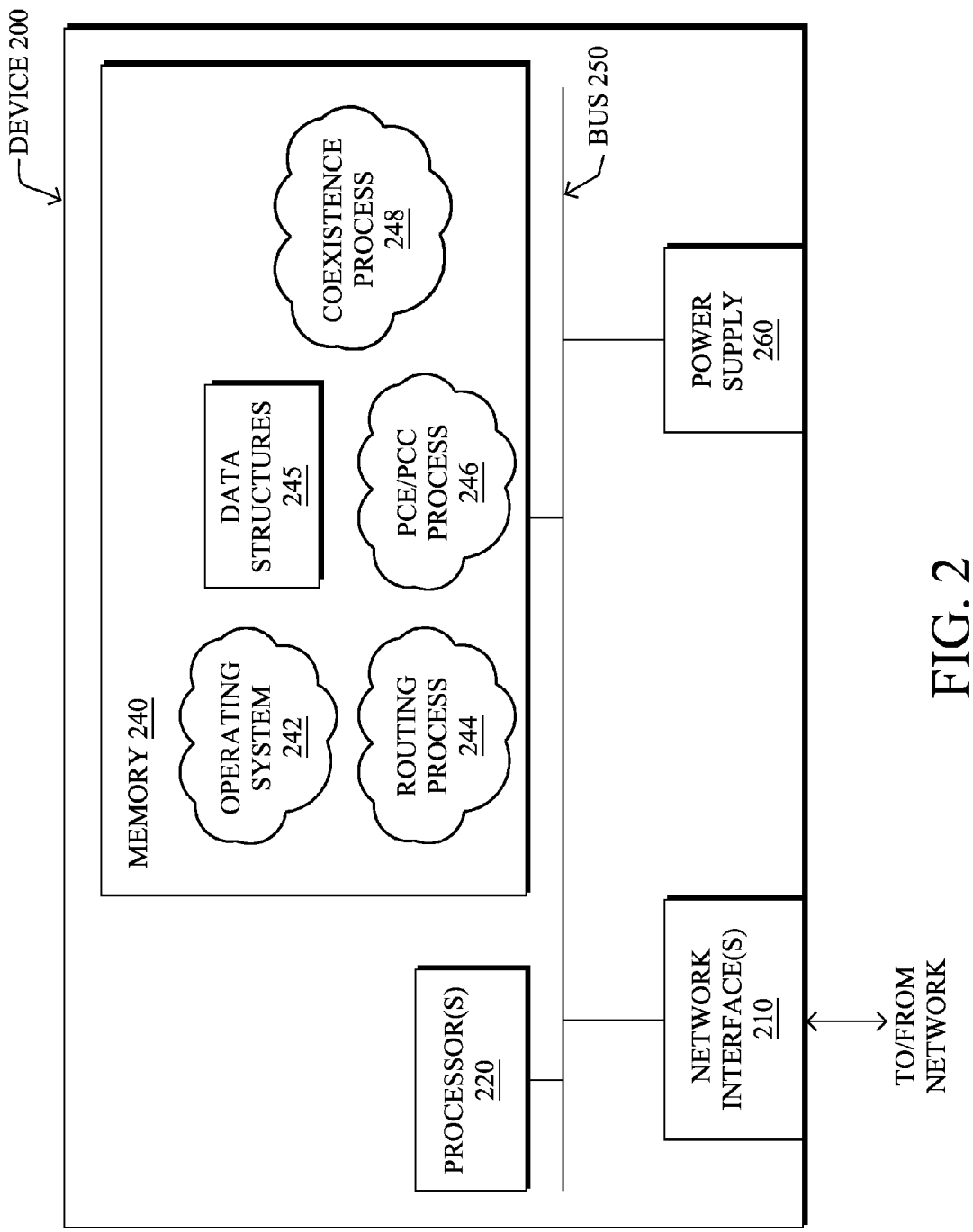
FIG. 2 illustrates an example network device/node.

FIG. 2 is a schematic block diagram of an example node/device 200 that may be used with one or more embodiments described herein, e.g., as any of the nodes 110 or servers (e.g., path computation elements or "PCEs") shown in FIG. 1 above. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a "PCE/PCC" process 246, and an illustrative "coexistence" process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive (or reactive) routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" (or "Internet of Everything") network. Loosely, the term "Internet of Things" or "IoT" (or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
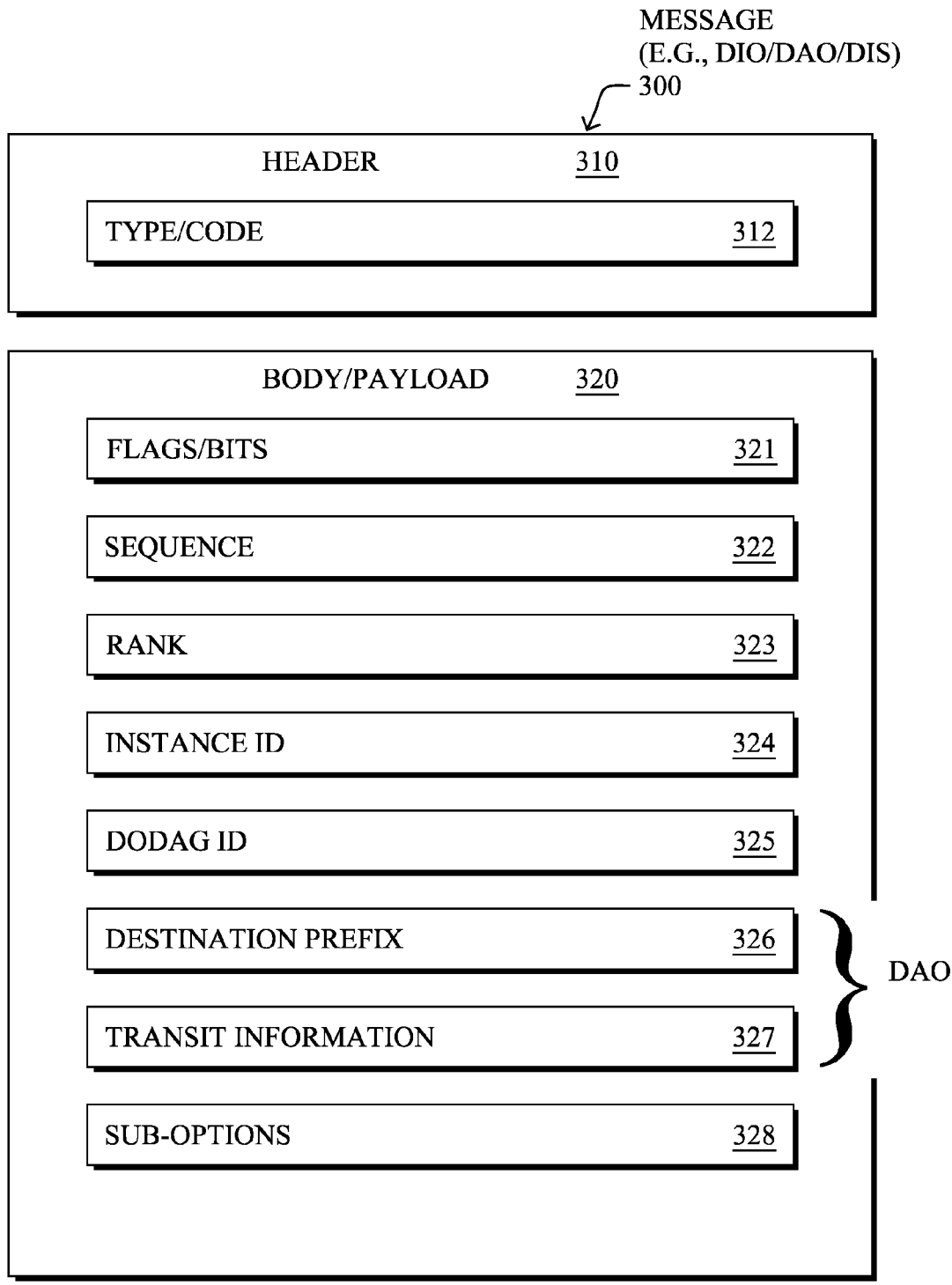
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Notably, industrial communication systems deployed today mostly use serial communications (most of them being proprietary) between sensors / actuators and a Programmable Logic Controller. Ethernet communication is also widely used for process and discrete manufacturing. For example, many SCADA (supervisory control and data acquisition) systems use Ethernet communication technologies to communicate with the Programmable Logic Controllers.

Recently with the emergence of new wireless technologies like IEEE 802.11, IEEE 802.15.4, it is becoming increasingly efficient and easy to deploy new sensors/actuators on a factory assembly line at a very low cost (e.g., no need to add wire/cable, no wire cuts, etc.), and to deploy new monitoring applications in an economically viable fashion (e.g., vents, corrosion), adding new capabilities such as automated matching flow meters along a pipe for leak detection, or lighting based on human presence for power saving, as well as allowing for applications with rotating devices, moving cranes, robots arms, or mobile handheld devices. Monitoring applications represent orders of magnitude more sensors than traditional control loops and the number of new wireless connected device deployments is growing exponentially. These new technologies have gained in robustness, stability, and security, making these deployments feasible.

However, customer requirements in the industrial space are focusing on the determinism of the network communications and their standardization, particularly since industrial networking generally requires having predictable communications between devices (e.g., a refinery's processing controls), as well as other applications, such as inflight control systems, internal vehicle connectivity, and so on. As noted above, deterministic networking refers to networks that can guarantee the delivery of packets within a bounded time. This generally translates to the following characteristics:

Guarantee of delivery;
Fixed latency; and
Jitter close to zero (micro seconds to 10s of milliseconds depending on application).

Typically, two methods are used to meet these requirements:
Quality of Service (QOS) and 802.1Q mechanisms; and
Time scheduled mechanisms.

Both methods may be used for Ethernet or Wireless technologies. There are also techniques that combine QOS technologies with time schedules (e.g., emissions of packets on the different QOS queues being triggered by a schedule-based gate mechanism). Achieving these characteristics within the architecture of an LLN, however, is not trivial, due to the constrained nature of LLNs.

In an example embodiment, Deterministic Ethernet or Deterministic Wireless based on time-scheduled mechanisms require that all the nodes being part of a path are to be time synchronized. Each packet forwarding is then regulated by a time schedule that specifies when this specific packet has to be transmitted to the wire or the radio and this continues for each node on the path. This specific time period is called a time slot. An external box (called orchestrator) usually does the computation of this path and the associated timetable. When the computation is done, the path and the time table is then pushed to every node participating in the forwarding, such that they can receive and transmit the packet according to the schedule. In the case of Deterministic Wireless, many systems used channel-hopping functionality, and the timetable in this case should define the time slot and the frequency channel to use. Illustratively, for the 802.15.4 protocol, a specific extension to the standard has been defined: 802.15.4e "Time Slotted Channel Hopping" (TSCH). TSCH is a medium access technique, which uses time synchronization to achieve ultra low-power operation and channel hopping to enable high reliability. The Time-Slotted aspect of the TSCH technology is a Time Division Multiplexing (TDM) technique, which requires all nodes in the network to be time synchronized. Time is sliced up into time slots, which are long enough for a MAC frame of maximum size to be sent from mote (node) B to mote A, and for mote A to reply with an acknowledgment (ACK) frame indicating successful reception.

In addition, path computation elements (PCEs), as defined, for example, in the Internet Engineering Task Force's Request for Comment (RFC) 4655, generally consist of relying on an external engine (PCE) responsible for the computation of paths or tunnels in the network (e.g., a computational entity that can be hosted on a router or external server). Head-ends (or Path Computation Clients—

PCCs) may send requests to PCEs (PCReq messages) using a PCEP signaling protocol (RFC 5440), and receive computed paths thanks to replies (PCRep messages). PCEP supports a variety of complex messages with priority, attributes, constraints, etc., along with IGP-based PCE discovery using OSPF and ISIS of static and dynamic attributes. Various algorithms (usually not standardized) have been specified for PCE selection and load balancing. Two forms of PCE exist: (1) Stateless (computation of paths/tunnels is memory-less and the PCE does not maintain LSP states but simply the TED (Traffic Engineering Database) for the majority of the cases; and (2) stateful where the PCE also maintains the LSP's state, which provides more optimum path computation (avoiding double booking allocation, allowing for global optimization, etc.) at the cost of additional complexity. Inter-PCE path computation has also been specified to handle the case where a single PCE would not have complete visibility of the routing domain, thus requiring some form of collaboration between PCEs to compute a path/tunnel, while preserving confidentiality between routing domains.

Notably, the PCE has generally been specified for high-bandwidth networks, such as core service provider networks. As such, PCE protocols and various mechanisms (e.g., signaling required for PCE discovery, PCC-PCE signaling protocols such as PCEP, etc.) have typically been quite heavy in terms of control plane overhead and various state maintenance. Although the overall architecture is preserved, the use of a PCE-based architecture for Deterministic Wireless requires a number of enhancements, such as new protocols and algorithms and mechanisms to operate in the highly constrained environments of LLNs, as discussed above. Furthermore the PCE has been designed to compute paths, though in the context of Deterministic Wireless, what is required is not only to compute paths, but also time slot allocation (in others words, knowing the traffic matrix, paths, and time slot allocation is intimately coupled, which changes the paradigm of routing and network operations, introducing new issues that require new mechanisms).

Coexistence of Distributed Routing and Centralized Path Computation

Notably, for "classic" routing protocols, the issue of coexistence does not really exist, and what is often found is a separation of domains such as areas or autonomous systems managed by different routing protocols so that domains do not overlap. Also, traditional routing protocols such as OSPF will compute the best path any to any communication. On the other hand, in sensor networks such as Deterministic Wireless, for reasons of scale and economy, a routing protocol typically only computes a narrow subset of all the possible routes (that OSPF would have computed), and allows for stretch and temporary inconsistencies (none of which is acceptable for OSPF). In order to achieve different results (routes or route properties), certain configurations execute multiple routing protocols over a same domain.

The techniques herein allow the coexistence of RPL and PCE-based routes over a same set of sensor devices (where some flows would be routed over a graph computed by the RPL routing protocol whereas other flows would be routed according to the explicit path computed by the PCE). In particular, the routes computed by both protocols have very different properties, and constraints, and as such, the techniques herein provide specific provisions in the way the protocols are used so as to respect the constraints of the other protocol. Initially, though, the two protocols are not designed to interact or share common resources: PCE expects a green field to provide optimized paths, while RPL accounts for memory, bandwidth, and battery constraints, but does not expect the PCE to step in and consume some of the resources that RPL depends on for routing and forwarding.

The techniques herein allow the two path computation protocols to work efficiently together in a deterministic wireless network, namely a centralized (e.g., PCE-based) path computation technique and a distributed routing protocol (e.g., RPL). There are several components described within this disclosure that allows the two coexistent routing protocols to collaborate. Specifically, according to one or more embodiments of the disclosure as described in detail below, a device both communicates with a network operating a distributed proactive routing protocol, and participates in a centralized path computation protocol (where the device may be a centralized PCE or a device within the network (e.g., a FAR or other device)). The device communicates routing characteristics of the distributed proactive routing protocol for the network from the network to the centralized path computation protocol, and also communicates one or more computed paths from the centralized path computation protocol to the network, where the computed paths from the centralized path computation protocol are based on the routing characteristics of the distributed proactive routing protocol for the network.

Illustratively, the techniques described herein may be performed by hardware, software, and/or firmware, such as in accordance with the "coexistence" process 248, which may contain computer executable instructions executed by the processor 220 to perform functions relating to the techniques described herein, e.g., in conjunction with (or as corresponding parts of) routing process 244 and PCE/PCC process 246 (which contains computer executable instructions to operate according to one or more of the PCE and/or PCC protocols described above). For example, the techniques herein may be treated as extensions to conventional protocols, such as RPL and the various PCE protocols, and as such, may be processed by similar components understood in the art that execute those protocols, accordingly.

Operationally, the techniques herein may apply a number of measures that can be added to the RPL and/or PCE protocols to make them more "polite." Generally, such measures may fall into either of two categories, namely, protocol aware (PA) and protocol independent (PI) measures. Protocol aware generally implies that protocol A understands some specific constraints in protocol B and will act based on that understanding (e.g., avoiding interference with protocol B). Protocol independent measures, on the other hand, are measures that a protocol will implement regardless of whether competition for resources comes from a same or different protocols.

Figure 4:
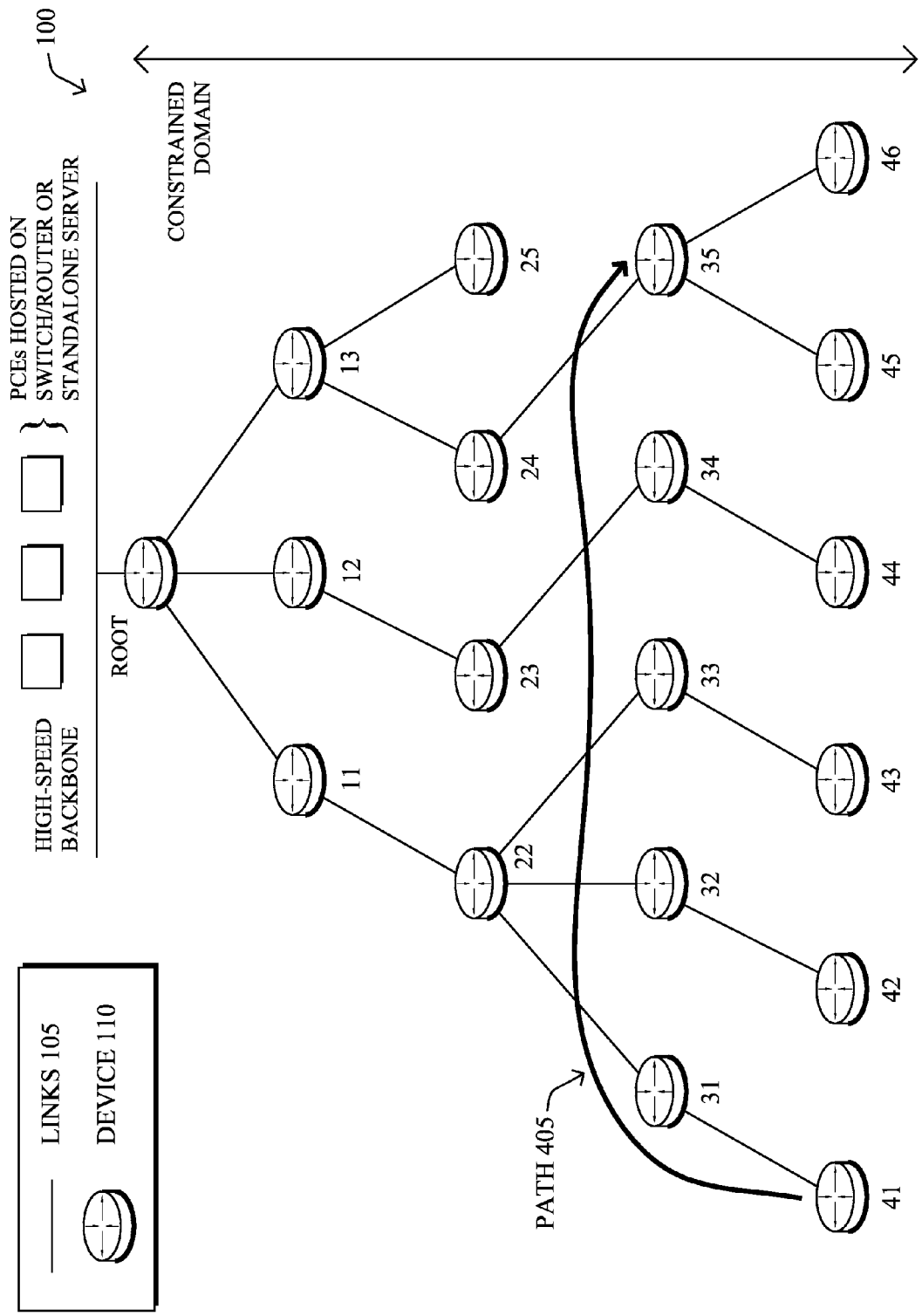
FIGS. 4-8B illustrate examples of protocol coexistence measures.

A first protocol aware measure is based on the fact that RPL (as an example distributed proactive routing protocol) is a mesh protocol and uses P2MP and MP2P paths through a DAG directed to and from a root for both control and data. By advertising the RPL rank to the PCE, the techniques herein may configure the PCE to favor routes that are orthogonal (i.e., close to or at the same rank) to the routes that lead to and from the root (along the DAG). For example, as shown in FIG. 4, while assuming that links 105 represent DAG connectivity, a path 405 may be established by the PCE that attempts to be as orthogonal as possible between two nodes (e.g., nodes 41 and 35).

Figure 5:
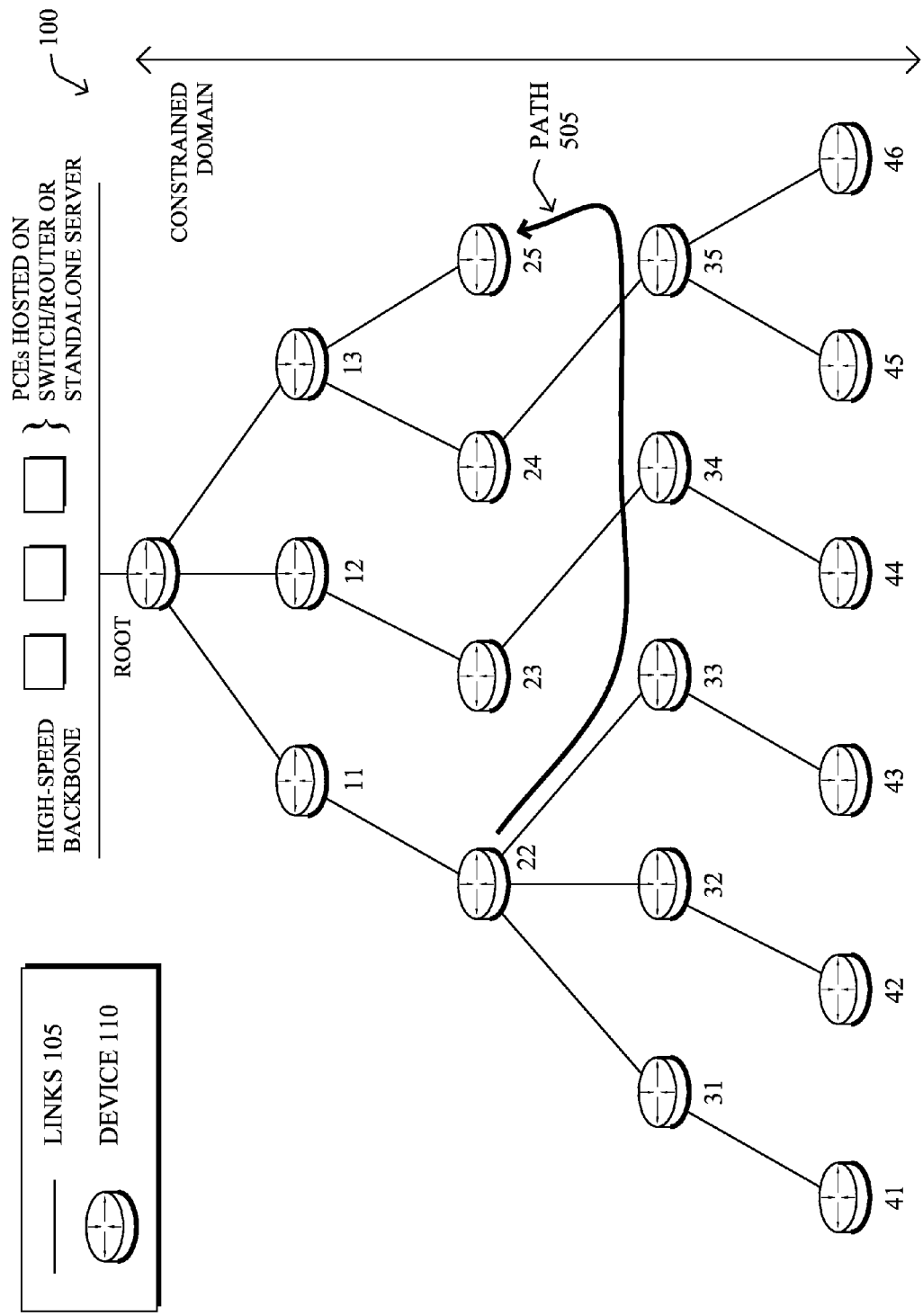

Also, time slot density for RPL augments with closeness to the root, so to avoid closeness to the root as much as possible, when route constraints permit, the PCE will compute paths that go away and around the root, such as path 505 shown in FIG. 5 from node 22 to 25 (e.g., rather than going via the root, or even via nodes 11, 12, or 13).

Figure 6:
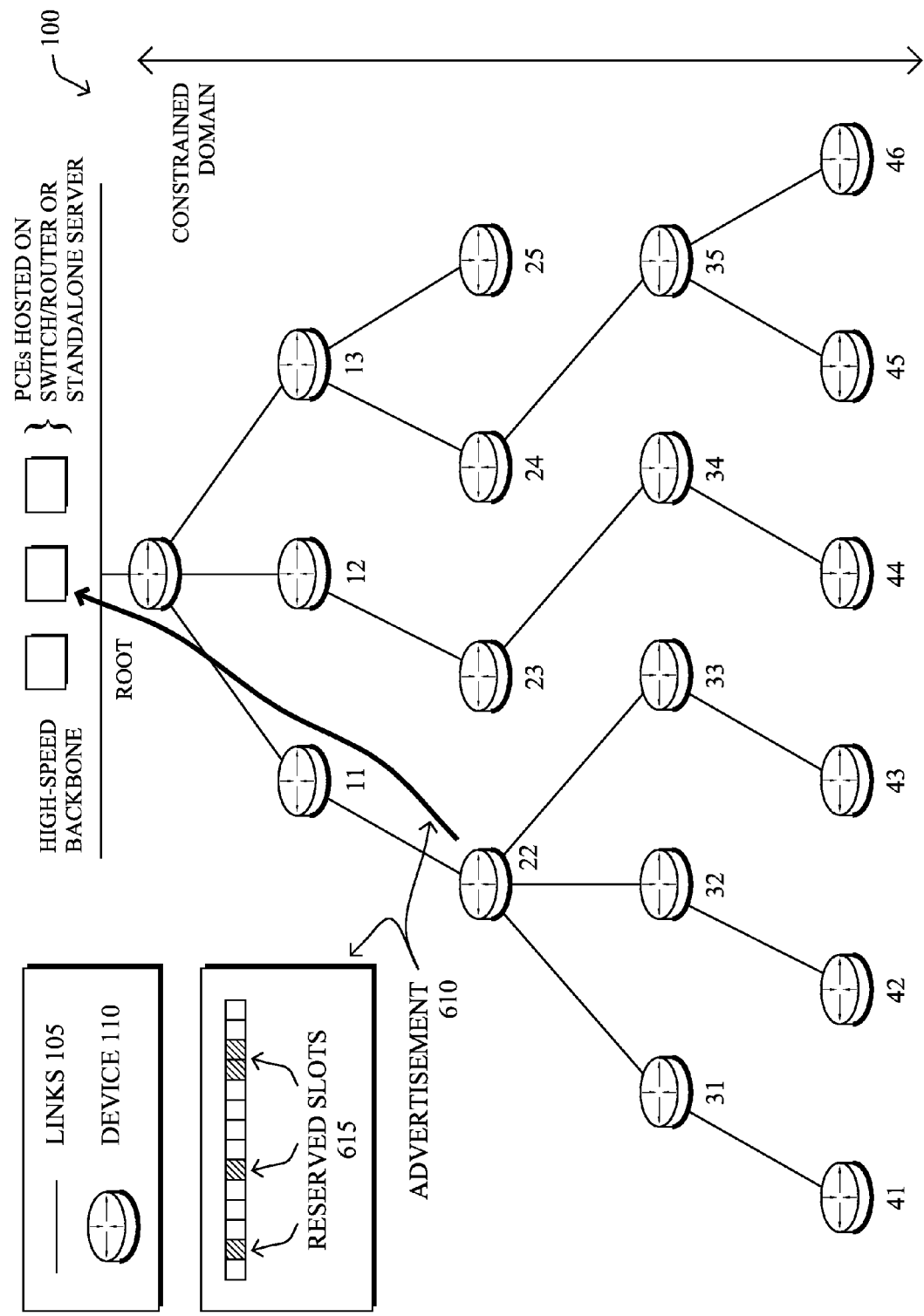

Furthermore, as another protocol aware measure, it is important to note that RPL uses multicast slots for parent-to-child control. These slots are critical for RPL operation and disrupting those may cause routing churn. For instance, these slots are agreed between parent router and all of its children, so changing them involves more cost than for unicast. The amount of time slots can be evaluated from the size of the network and the reactivity to breakage that is expected. A reasonable amount of time slots may be reserved by each RPL router, and according to one or more embodiments herein, those reserved timeslots are advertised to the PCE. As such, the PCE may not use those slots in its path computation. FIG. 6 illustrates an example advertisement 610 from node 22, comprising an indication of the reserved timeslots (shown as a graphical representation 615), accordingly. Note that in some networks that allow for star topologies, the fixed frequency of slow hopping channel can be used for that purpose.

Figure 7:
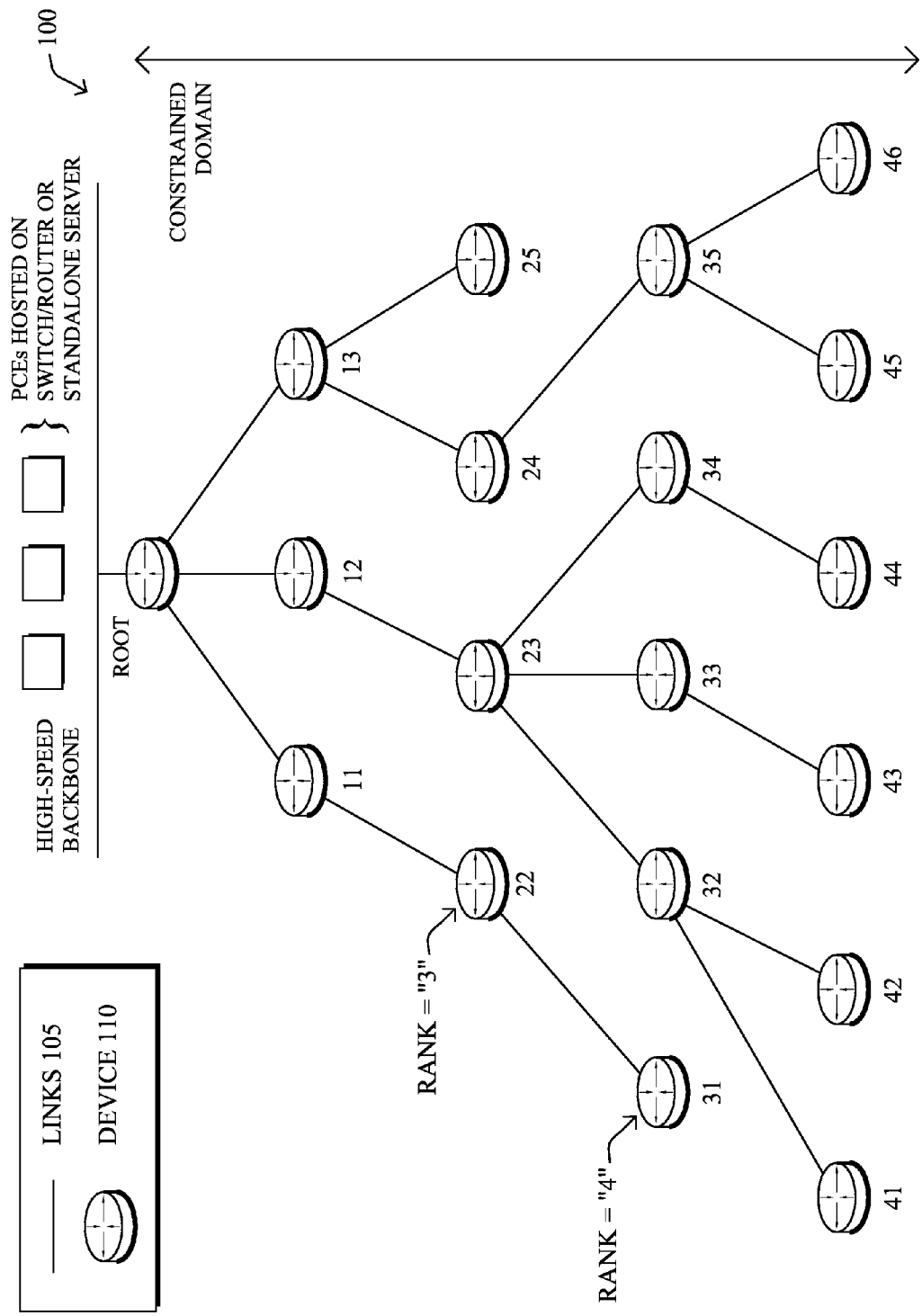

According to one or more additional embodiments herein, RPL operates in the devices where PCE routes are installed, so it is possible to determine the related slot utilization. As the PCE installs more routes through a router, this router gets loaded and thus less available to carry RPL traffic. With the techniques herein, the Objective Function (OF) may be made sensitive to the slot usages from alternate protocols such as PCE paths, and that usage may illustratively cause the Rank to augment, making this router less attractive as a RPL parent. In other words, the techniques herein may re-inject in the RPL routing protocol information about paths computed by another engine such as the PCE. As an example, as shown in FIG. 7, assume that node 22 is a rank "2" node (two hops from the root). However, if there is a large number of PCE routes using this node (determined illustratively based on the slot utilization by the PCEs), then RPL may have node 22 advertise its rank as "3", such that nodes 31, 32, and 33 may attempt to find another rank 2 node as their parent, alleviating some of the RPL use of node 22, accordingly. As shown, nodes 32 and 33 select node 23, while node 31 remains with node 22 (e.g., unable to reach node 23), and thus becomes a rank 4 device (though technically only three hops away from the root). Note that in this case, children of node 31 may alter their parent selection as well, such as node 41 now selecting node 32 (since node 32 is a rank 3 device, while node 31 is showing as a rank 4 device).

Figure 8A:
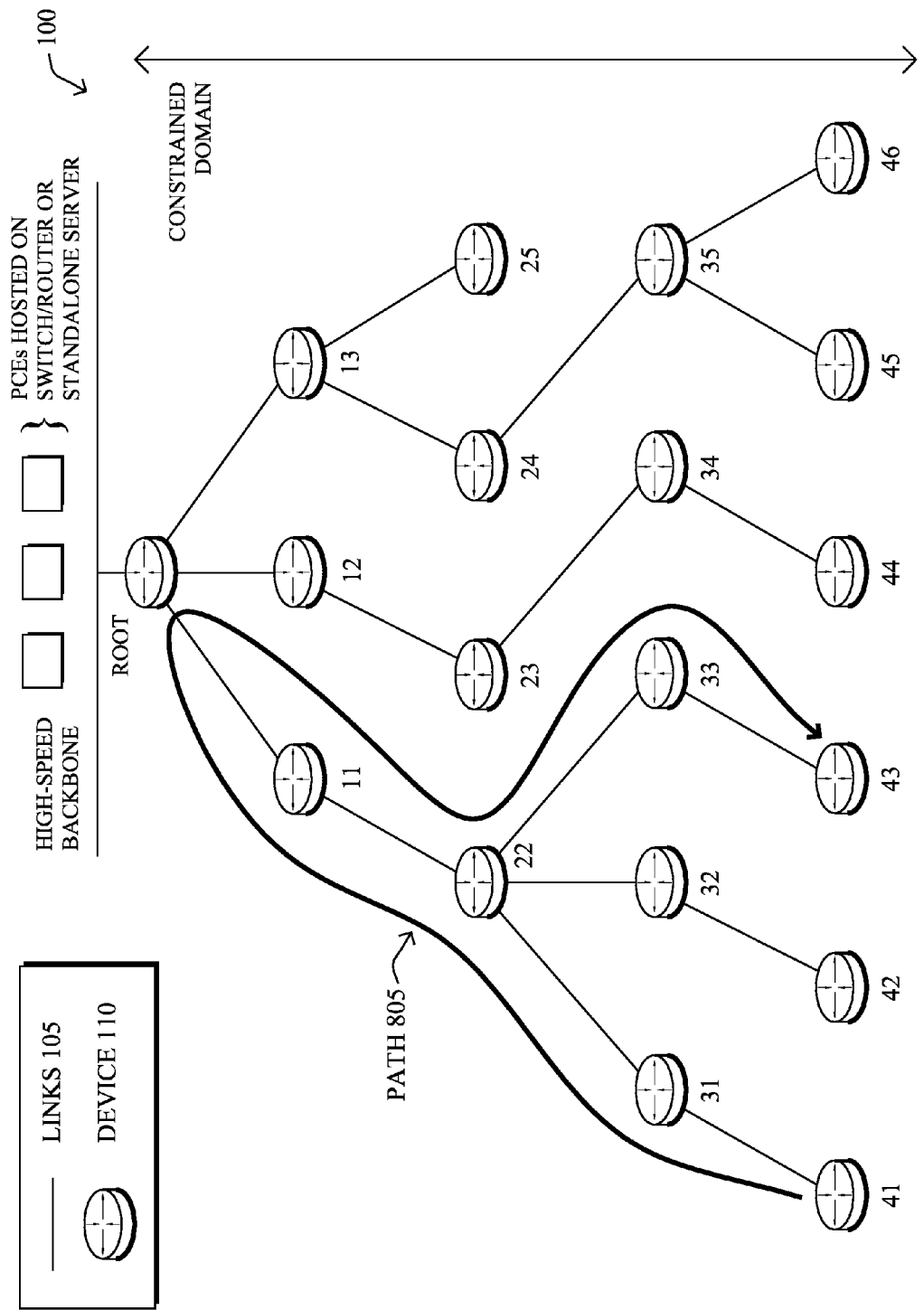
Figure 8B:
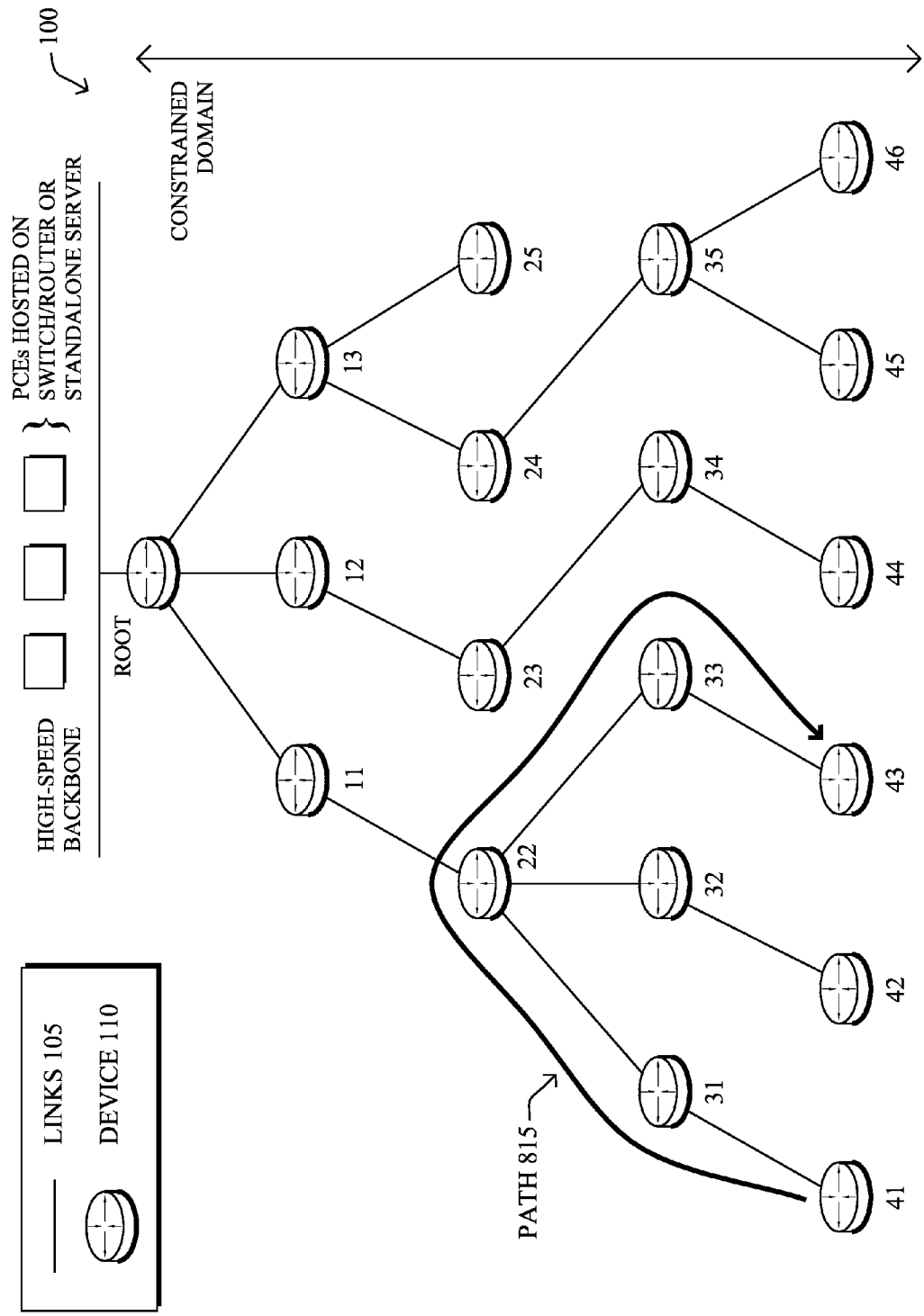

As still another protocol aware measure, as shown in FIGS. 8A and 8B, RPL causes forwarding up to the common parent and then down, such as path 805 in FIG. 8A. It is not capable to compute the stretch between a RPL route and an optimized path as could be computed by the PCE. When a RPL router detects that it acts as common parent and routes a flow down that it received as going up, such as node 11, it may ask the PCE for a better route computation which will be added by the PCE in the routers along the path (i.e., detecting a knee and inferring that this means that a shortcut is probably achievable for the PCE). For example, as shown in FIG. 8B, a new path 815 may be computed that avoids using the same link in opposing directions.

In yet another embodiment, the DAG root may start observing the number of route changes performed by the RPL protocol (topology changes can be observed by RPL upon receiving routing topology changes thanks to the RPL DAO messages). If the DAG root determines that the number of parent selection changes too often for a set of specific nodes, the techniques herein may use a newly defined message (e.g., IPv6 notification message) sent by the RPL DAG root to the PCE to inform the PCE of the set of nodes that are less or more selected by RPL nodes. Such information may be advantageously used by the PCE to potentially compute different optimized routes at the cost of being less optimal if the PCE can correspondingly increase the stability of the distributed coexistence routing protocol in the network (i.e., close loop control between two routing protocols to better optimize their mode of operation). In particular, the PCE should not generally be made aware of all the routing churn in the LLN network, since that would consume too many resources (energy, bandwidth, etc.). Thus the PCE may compute unstable routes. The techniques herein therefore adds hints from the RPL root about which pieces of the network are stable, such as by screening the DAO sequence number increments. Based on that, the PCE may compute longer but more stable routes.

As mentioned, various protocol independent measures may also be implemented according to one or more embodiments of the techniques herein. For instance, depending on the position in the network (e.g., close to the route with RPL) the occupation of TimeSlots (the energy in the air) might be more or less dense, as noted above. Each node may thus determine, by screening the radio space and considering its own allocations, how much the bandwidth is utilized (or free) in its listening range. A PCE may thus include its best knowledge of the TimeSlot usage density at each node in the cost computation of new routes. A routing protocol may be constrained to use a maximum amount of TimeSlots at a given node at a given cost. If that maximum is reached, then the cost of the link should be augmented for new routes.

Other protocol independent measures may be used, such as including local link information such as exponential back off usage and ETX in the cost if the link. Also, it may be possible to allow some specific nodes (considered as leaves by RPL) to be deployed with a high speed connection to the backbone for use by the PCE as backbone access for PCE computed routes. Furthermore, since it is also critical that RPL roots share the overall load whether they work on a same instance or a different instance, notions such as priority and fair share may be put in place between protocols to tell whether a protocol can obtain new slots, thus enforcing a ratio of time slots guaranteed to traffic that is managed by each protocol at a given node.

Figure 9:
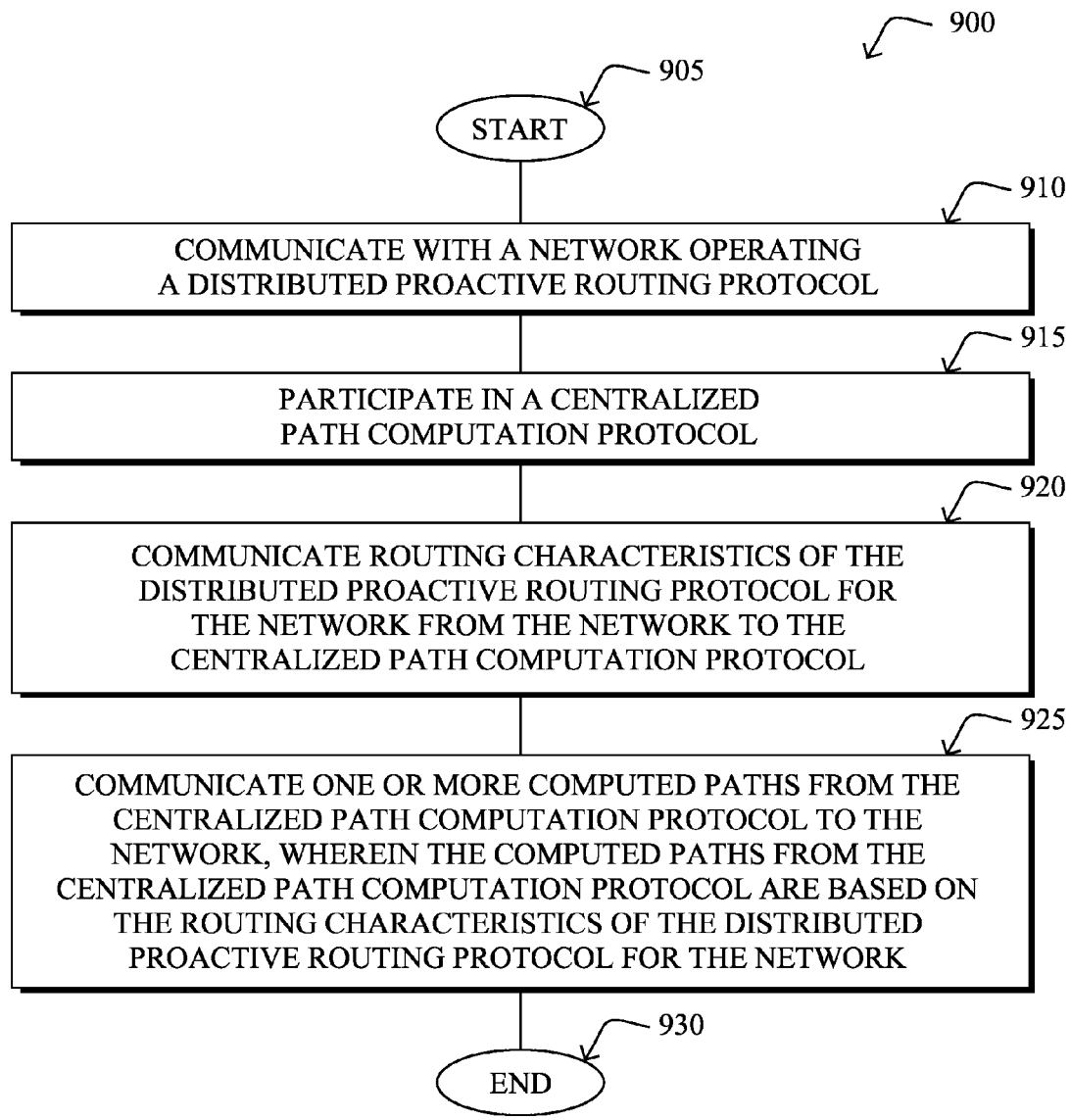
FIG. 9 illustrates an example simplified procedure for co-existence of a distributed routing protocol and centralized path computation, particularly for deterministic wireless networks.

FIG. 9 illustrates an example simplified procedure 900 for co-existence of a distributed routing protocol and centralized path computation, particularly for deterministic wireless networks, in accordance with one or more embodiments described herein. The procedure 900 may start at step 905, and continues to step 910, where, as described in greater detail above, a device (e.g., a PCE or a network node, depending upon perspective and function) communicates with a network operating a distributed proactive routing protocol. In addition, in step 915, the device may also participate in a centralized path computation protocol. For instance, as a PCE, the communication with the distributed proactive routing protocol may consist in communication with a RPL DAG root, and participation with a centralized path computation protocol is acting as a PCE. On the other hand, as a network node, the communication with the distributed proactive routing protocol may consist in communication within the RPL network (e.g., as a RPL DAG root or as any node in the network), and participation with a centralized path computation protocol is acting as a PCC, or as an "informant" to the PCE (e.g., sharing RPL information with the PCE).

In step 920, the device communicates (e.g., receives or transmits) routing characteristics of the distributed proactive routing protocol for the network from the network to the centralized path computation protocol, as described above, such that in step 925, the device may communicate (e.g., compute and transmit, or request and receive) one or more computed paths from the centralized path computation protocol to the network, where the computed paths from the centralized path computation protocol are based on the routing characteristics of the distributed proactive routing protocol for the network.

Illustratively, as detailed above, such communication in steps 920 and 925 may consist of any one or more of the following particular embodiments:

a) advertising/receiving node rank as a routing characteristic, where the PCE favors routes that are orthogonal to routes that increase or decrease in rank;

b) advertising/receiving node rank as a routing characteristic, where the PCE favors routes that avoid closeness to a root node based on the node rank;

c) advertising/receiving reserved timeslots as a routing characteristic, where the PCE avoids use of the reserved timeslots;

d) advertising/receiving a degree of routing changes as a routing characteristic, where the PCE computes paths that increase stability of the distributed proactive routing protocol based on the degree of routing changes;

e) advertising/receiving a timeslot usage density as a routing characteristic, where the PCE computes paths that use the timeslot usage density as a path cost characteristic.

f) determining (as a network node) that a portion of a route used in the distributed proactive routing protocol uses a same link in opposite directions, and requesting a corresponding route to avoid using the same link in opposite directions from the PCE; and g) determining, by a RPL node, timeslot usage of the centralized path computation protocol (e.g., PCE routes), and reducing attractiveness of the particular RPL node for selection as a parent node within RPL based on increased timeslot usage (e.g., performed by the nodes themselves, or by the RPL root node).

The simplified procedure 900 illustratively ends in step 930, though may continue to update information, request/receive new paths, etc. It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for co-existence of a distributed routing protocol and centralized path computation, particularly for deterministic wireless networks. In particular, the techniques herein allow for establishment of an engineered deterministic LLN, mixing both RPL and PCE topologies to better optimize traffic. For instance, as described above, RPL information is communicated over the backbone from the RPL root to the PCE for the benefit of PCE routes that can be established preferably between stable nodes.

While there have been shown and described illustrative embodiments that provide for co-existence of a distributed routing protocol and centralized path computation, it is to be understood that various other adaptations and modifications may be made within the spirit and scope of the embodiments herein. For example, the embodiments have been shown and described herein with relation to deterministic wireless networks. However, the embodiments in their broader sense are not as limited, and may, in fact, be used with other types of networks and/or protocols. In addition, while certain protocols are shown, such as RPL and PCE protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
communicating, by a device, with a network operating a distributed proactive routing protocol, wherein the distributed proactive routing protocol is a routing protocol for low-Power and lossy networks (RPL);
participating, by the device, in a centralized path computation protocol; and
configuring, the device, to both communicate with the network operating the distributed proactive routing protocol and participate in a centralized computation protocol by:
communicating, by the device, routing characteristics of the distributed proactive routing protocol for the network from the network to the centralized path computation protocol, and
communicating, by the device, one or more computed paths from the centralized path computation protocol to the network, wherein the computed paths from the centralized path computation protocol are based on the routing characteristics of the distributed proactive routing protocol for the network.

2. The method as in claim 1, further comprising:
receiving node rank as a routing characteristic communicated to the centralized path computation protocol; and
favoring routes by the centralized path computation protocol that are orthogonal to routes that increase or decrease in rank.

3. The method as in claim 1, further comprising:
receiving node rank as a routing characteristic communicated to the centralized path computation protocol; and
favoring routes by the centralized path computation protocol that avoid closeness to a root node based on the node rank.

4. The method as in claim 1, further comprising:
receiving reserved timeslots as a routing characteristic communicated to the centralized path computation protocol; and
avoiding use of the reserved timeslots by the centralized path computation protocol.

5. The method as in claim 1, further comprising:
receiving a degree of routing changes as a routing characteristic communicated to the centralized path computation protocol; and computing paths by the centralized path computation protocol that increase stability of the distributed proactive routing protocol based on the degree of routing changes.

6. The method as in claim 1, further comprising:
receiving a timeslot usage density as a routing characteristic communicated to the centralized path computation protocol; and
computing paths by the centralized path computation protocol that use the timeslot usage density as a path cost characteristic.

7. The method as in claim 1, further comprising:
determining that a portion of a route used in the distributed proactive routing protocol uses a same link in opposite directions; and
requesting a corresponding route to avoid using the same link in opposite directions from the centralized path computation protocol.

8. The method as in claim 1, further comprising:
determining, by the distributed proactive routing protocol, timeslot usage of the centralized path computation protocol for particular nodes in the network; and
reducing attractiveness of the particular nodes for selection as parent nodes within the distributed proactive routing protocol based on increased timeslot usage.

9. The method as in claim 1, wherein the method is performed by a node in the network.

10. The method as in claim 1, wherein the method is performed by a path computation element (PCE).

11. An apparatus, comprising:
one or more network interfaces to communicate with a network;
a processor coupled to the network interfaces and adapted to execute one or more processes; and
a memory configured to store a process executable by the processor, the process when executed operable to:
communicate with a network operating a distributed proactive routing protocol, wherein the distributed proactive routing protocol is a routing protocol for low-Power and lossy networks (RPL);
participate in a centralized path computation protocol; and
configure, the apparatus, to both communicate with the network operating the distributed proactive routing protocol and participate in a centralized computation protocol by:
communicate routing characteristics of the distributed proactive routing protocol for the network from the network to the centralized path computation protocol, and
communicate one or more computed paths from the centralized path computation protocol to the network, wherein the computed paths from the centralized path computation protocol are based on the routing characteristics of the distributed proactive routing protocol for the network.

12. The apparatus as in claim 11, wherein the process when executed is further operable to:
receive node rank as a routing characteristic communicated to the centralized path computation protocol; and
favor routes by the centralized path computation protocol that are orthogonal to routes that increase or decrease in rank.

13. The apparatus as in claim 11, wherein the process when executed is further operable to:
receive node rank as a routing characteristic communicated to the centralized path computation protocol; and
favor routes by the centralized path computation protocol that avoid closeness to a root node based on the node rank.

14. The apparatus as in claim 11, wherein the process when executed is further operable to:
receive reserved timeslots as a routing characteristic communicated to the centralized path computation protocol; and
avoid use of the reserved timeslots by the centralized path computation protocol.

15. The apparatus as in claim 11, wherein the process when executed is further operable to:
receive a degree of routing changes as a routing characteristic communicated to the centralized path computation protocol; and
compute paths by the centralized path computation protocol that increase stability of the distributed proactive routing protocol based on the degree of routing changes.

16. The apparatus as in claim 11, wherein the process when executed is further operable to:
receive a timeslot usage density as a routing characteristic communicated to the centralized path computation protocol; and
compute paths by the centralized path computation protocol that use the timeslot usage density as a path cost characteristic.

17. The apparatus as in claim 11, wherein the process when executed is further operable to:
determine that a portion of a route used in the distributed proactive routing protocol uses a same link in opposite directions; and
request a corresponding route to avoid using the same link in opposite directions from the centralized path computation protocol.

18. The apparatus as in claim 11, wherein the process when executed is further operable to:
determine, by the distributed proactive routing protocol, timeslot usage of the centralized path computation protocol for particular nodes in the network; and
reduce attractiveness of the particular nodes for selection as parent nodes within the distributed proactive routing protocol based on increased timeslot usage.

19. The apparatus as in claim 11, wherein the apparatus is a node in the network.

20. The apparatus as in claim 11, wherein the apparatus is a path computation element (PCE).

21. A tangible, non-transitory, computer-readable media having software encoded thereon, the software when executed by a processor operable to:
communicate, from a device, with a network operating a distributed proactive routing protocol, wherein the distributed proactive routing protocol is a routing protocol for low-Power and lossy networks (RPL);
participate, by the device, in a centralized path computation protocol; and
configure, the device, to both communicate with the network operating the distributed proactive routing protocol and participate in a centralized computation protocol by:
communicating routing characteristics of the distributed proactive routing protocol for the network from the network to the centralized path computation protocol, and
communicating one or more computed paths from the centralized path computation protocol to the network, wherein the computed paths from the centralized path computation protocol are based on the routing characteristics of the distributed proactive routing protocol for the network.

* * * * *